(12) United States Patent
Zheng

(10) Patent No.: US 8,157,406 B2
(45) Date of Patent: Apr. 17, 2012

(54) LED LAMP ASSEMBLY

(75) Inventor: Shi-Song Zheng, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 274 days.

(21) Appl. No.: 12/613,546

(22) Filed: Nov. 6, 2009

(65) Prior Publication Data

US 2011/0044033 A1 Feb. 24, 2011

(30) Foreign Application Priority Data

Aug. 19, 2009 (CN) .......................... 2009 1 0305805

(51) Int. Cl.
*F21L 4/00* (2006.01)
(52) U.S. Cl. .................... 362/183; 362/153; 362/431
(58) Field of Classification Search .................. 362/152, 362/153, 183, 191, 431
See application file for complete search history.

(56) References Cited

U.S. PATENT DOCUMENTS

| 4,200,904 | A | * | 4/1980 | Doan | 362/183 |
| 5,149,188 | A | * | 9/1992 | Robbins | 362/183 |
| 5,280,417 | A | * | 1/1994 | Hall et al. | 362/640 |
| 7,134,762 | B2 | * | 11/2006 | Ma | 362/102 |
| 7,731,383 | B2 | * | 6/2010 | Myer | 362/145 |
| 7,753,546 | B2 | * | 7/2010 | Kuelbs | 362/102 |
| 7,874,692 | B2 | * | 1/2011 | Zheng et al. | 362/102 |

* cited by examiner

*Primary Examiner* — John A Ward
(74) *Attorney, Agent, or Firm* — Altis Law Group, Inc.

(57) ABSTRACT

An LED lamp assembly includes a pole-shaped major lamp, an auxiliary lamp fixed on a top of the major lamp and a rechargeable battery mounted in the auxiliary lamp. The auxiliary lamp includes a lamp shell, a plurality of LED components accommodated in the lamp shell and a solar panel mounted thereon. A plurality of light-outputting windows are defined in a sidewall of the lamp shell. The rechargeable battery is charged by the solar panel. The major lamp is powered by electrical power from a power plant. The LED components of the auxiliary lamp are powered by the rechargeable battery to generate light radiating outside of the lamp shell through the light-outputting windows.

18 Claims, 8 Drawing Sheets

LED LAMP ASSEMBLY

BACKGROUND

1. Technical Field

The disclosure generally relates to LED (light emitting diode) lamps, and particularly to an LED lamp assembly incorporating a solar panel as an auxiliary power source for providing power to decorative lightening of the LED lamp assembly.

2. Description of Related Art

An LED has an advantage that it is resistant to shock, and has an almost eternal lifetime under a specific condition; thus, an LED lamp which consists of a plurality of LEDs is intended to be a cost-effective yet high quality replacement for incandescent and fluorescent lamps. Since the LED lamps have many advantages, the LED lamps are more and more popular. Generally, the LED lamp includes a plurality of LEDs being arranged in parallel lines for obtaining a desirable illumination brightness. Following the upgrade of life standard, the LED lamp is required to have not only the illuminating function but also the decorative function. It is preferred that the power for achieving the decorative function is from a solar power so that it will not need to consume the power for achieving the illumining function, which is from a conventional electrical power plant.

For the foregoing reasons, therefore, there is a need in the art for an LED lamp which can satisfy the requirement described.

DETAILED DESCRIPTION

Figure 1:
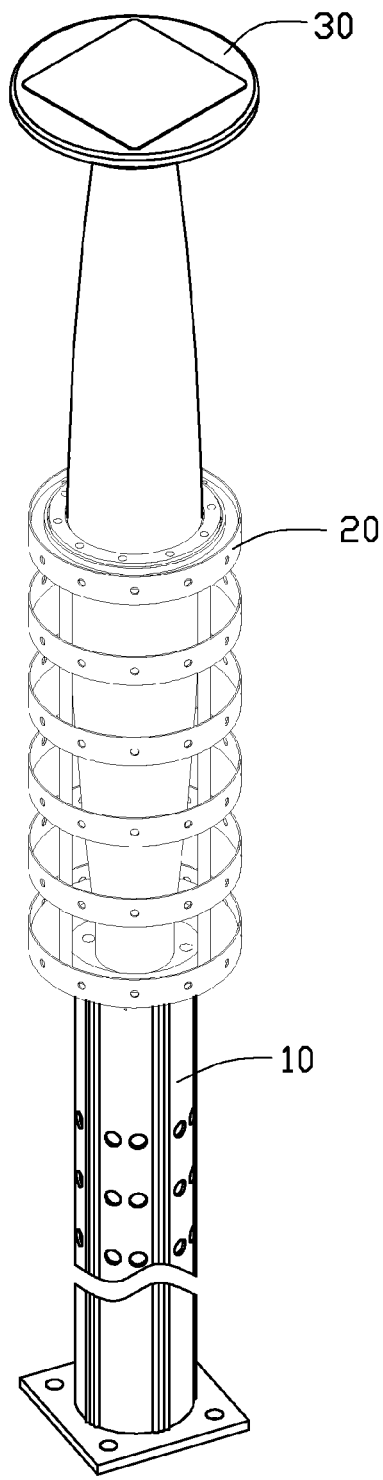
FIG. 1 is an isometric, assembled view of an LED lamp assembly according to an exemplary embodiment.
Figure 2:
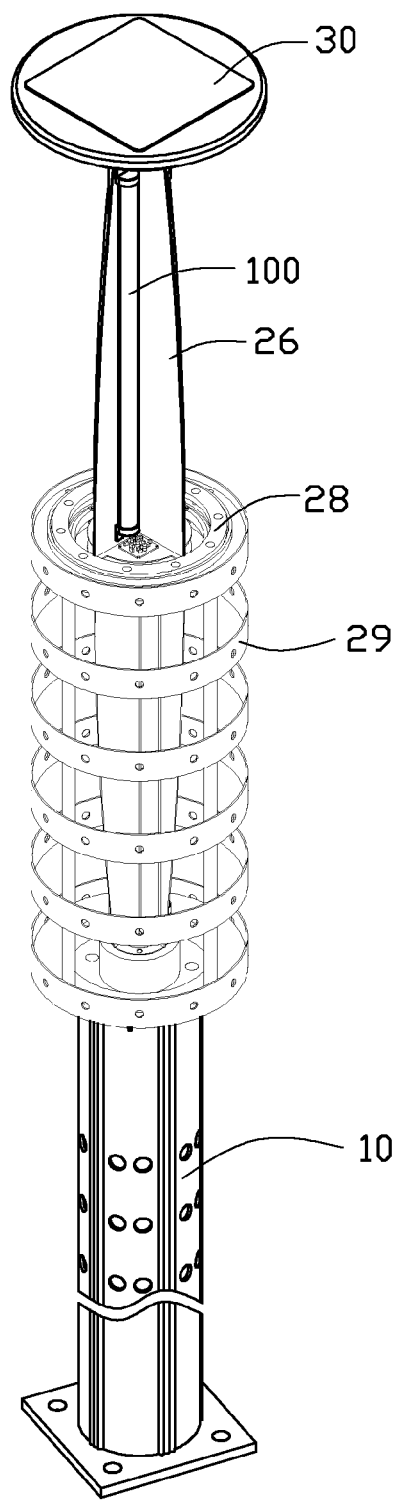
FIG. 2 is an isometric, assembled view of the LED lamp assembly of FIG. 1, with an envelope thereof removed away for clarity.

Referring to FIGS. 1 and 2, an LED lamp assembly according to an exemplary embodiment, which is mainly used as a street lamp or a park lamp, includes a lamp post 10, a major lamp 20 supported by a top of the lamp post 10 and an auxiliary lamp 30 mounted on a top of the major lamp 20.

Figure 3:
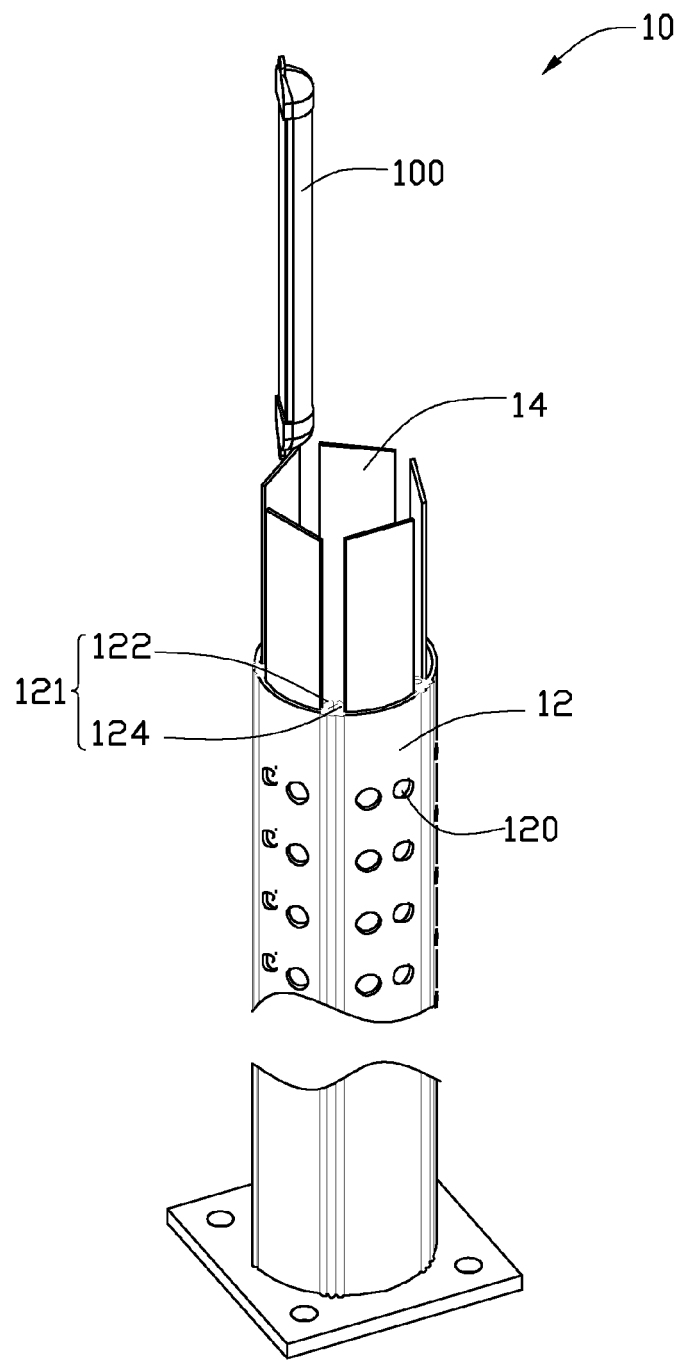
FIG. 3 is an enlarged, exploded view of a lamp post of the LED lamp assembly of FIG. 1.

Particularly referring to FIG. 3, the lamp post 10 is vertical, and includes a cylinder 12, a plurality of light-guiding plates 14 and a light emitting member 100. The cylinder 12 is hollow and elongated and defines a receiving space therein for receiving the light-guiding plates 14 and the light emitting member 100. The light-guiding plates 14 are received in the cylinder 12 and fixed on an inner wall of the cylinder 12. The light emitting member 100 is received in the cylinder 12, surrounded by the light-guiding plates 14 and secured to an inner side of one of the light-guiding plates 14. A plurality of openings 120 are evenly defined in the cylinder 12 for light generated by the light emitting member 100 traveling therethrough to illuminate an ambient environment surrounding the lamp post 10.

The cylinder 12 of the lamp post 10 has a plurality of holding parts 121 protruding inwardly from the inner surface thereof. The holding parts 121 are spaced from each other with a constant distance. The holding parts 121 each extend along a length of the cylinder 12 and are symmetrical to each other relative to a central axis of the cylinder 12. Each of the holding parts 121 includes two ribs 122 extending curvedly and toward each other from the inner wall of the cylinder 12. Each holding part 121 defines a groove 124 between the two ribs 122 thereof. The two ribs 122 of each holding part 121 are slantwise and at an acute angle to the inner wall of the cylinder 12, whereby each light-guiding plate 14 can be clipped between two neighboring holding parts 121 in the cylinder 12.

The light-guiding plates 14 are rectangular, elongated, and thin, and are made of semitransparent material for allowing a part of light generated by the light emitting member 100 to pass therethrough. Meanwhile, the light-guiding plate 14 on which the light emitting member 100 is secured reflects the other part of the light to other light-guiding plates 14. The light-guiding plates 14 are inserted into the cylinder 12 with opposite long sides thereof being located between the corresponding ribs 122 of the holding parts 121. The light-guiding plates 14 are thus secured in the cylinder 12 and positioned over the inner wall of the cylinder 12 to evenly distribute the light generated by the light emitting member 100 to the openings 120 of the cylinder 12. Thus, even if there is only one light source in the cylinder 12, i.e., the light emitting member 100, light can evenly radiate through all of the openings 120 of the cylinder 12 to have an aesthetically appealing illumination.

The light emitting member 100 is placed in the cylinder 12, located near one of the holding parts 121 and between two corresponding neighboring light-guiding plates 14. The light emitting member 100 is an elongated LED light bar in this embodiment, but also can be other types of light source such as a fluorescent light bar.

Figure 4:
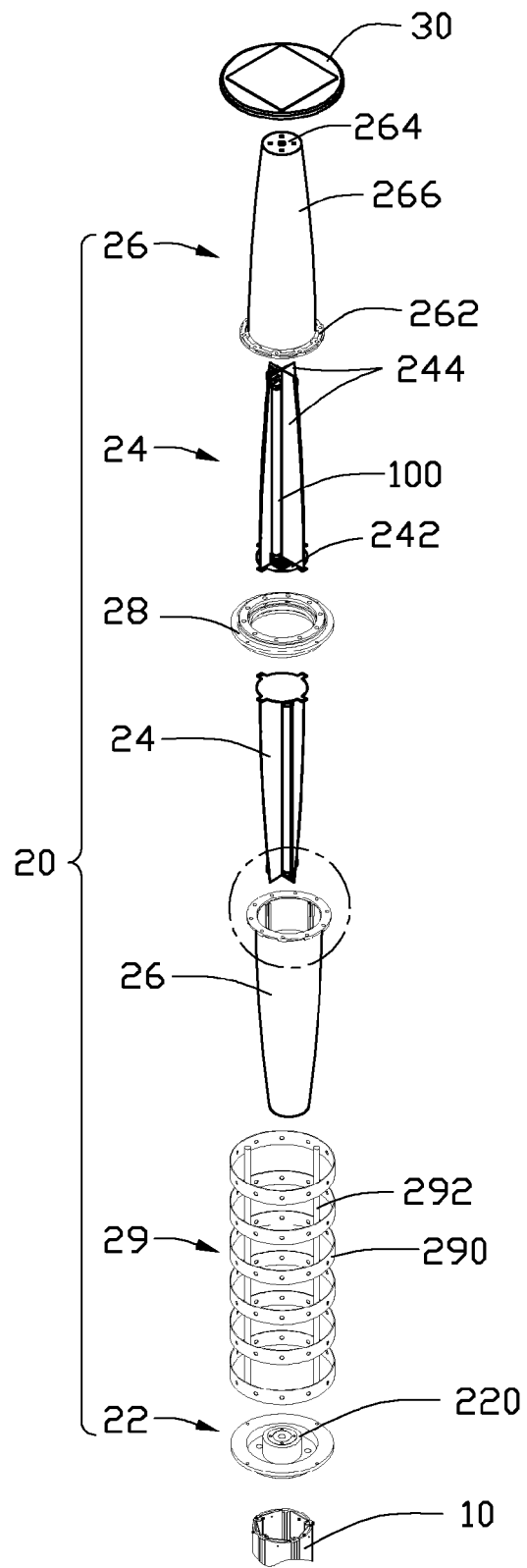
FIG. 4 is an exploded view of the LED lamp assembly of FIG. 1.
Figure 5:
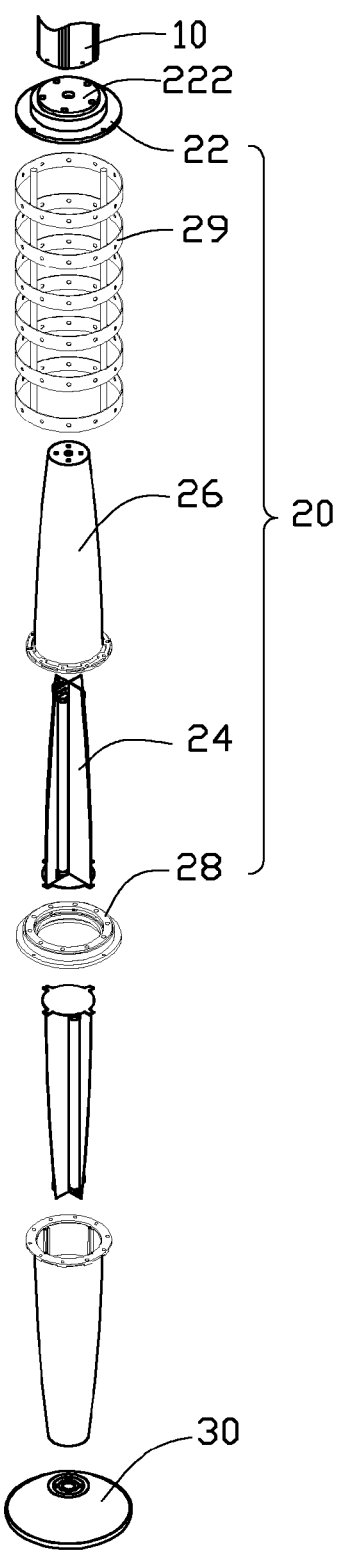
FIG. 5 is an inverted exploded view of the LED lamp assembly of FIG. 1.

Also referring to FIGS. 4 and 5, the major lamp 20 is pole-shaped and vertically supported on a top of the lamp post 10. The major lamp 20 comprises a connecting base 22 fixed on the top of the lamp post 10, two fixing brackets 24 in a butt joint with each other, two envelopes 26 respectively accommodating the two fixing brackets 24 therein, a connecting member 28 coupling the two envelopes 26 together and a protecting rail 29 mounted around a lower one of the envelopes 26.

The connecting base 22 is a circular plate and has a supporting part 220 protruding upwardly from a central part thereof and on which a lower end of the lower envelope 26 is rested. An inserting part 222 protrudes downwardly from the central part of the connecting base 22 and is inserted into an upper opening of the cylinder 12 of the lamp post 10 and locked in the cylinder 12 by screws or welding to couple the connecting base 22 to the lamp post 10.

Each fixing bracket 24 comprises a circular base plate 242 and two fixing plates 244 vertically standing on the base plate 242. The two fixing plates 244 perpendicularly intersect each other, wherein a point of the intersection is in a vertical alignment with the center of the base plate 242. A width of each fixing bracket 24 is decreased gradually from an end proximate to the connecting member 28 to an opposite end remote from the connecting member 28. Four additional elongated light emitting members 100 are mounted to the bracket 24, with two of the four additional elongated light emitting members 100 attached to opposite sides of a corresponding fixing plate 244. The four additional elongated light emitting members 100 are separated from each other by the fixing plates 244.

Each envelope 26 is made of transparent material, such as glass, and functions as an optical member. The envelope 26 has an annular engaging flange 262, a circular end plate 264 and a covering body 266 extending from an inner edge of the engaging flange 262 to an outer circumference of the end plate 264. The end plate 264 has a diameter smaller than an inner diameter of the engaging flange 262, whereby the envelope 26 is tapering from the engaging flange 262 to the end plate 264.

Figure 6:
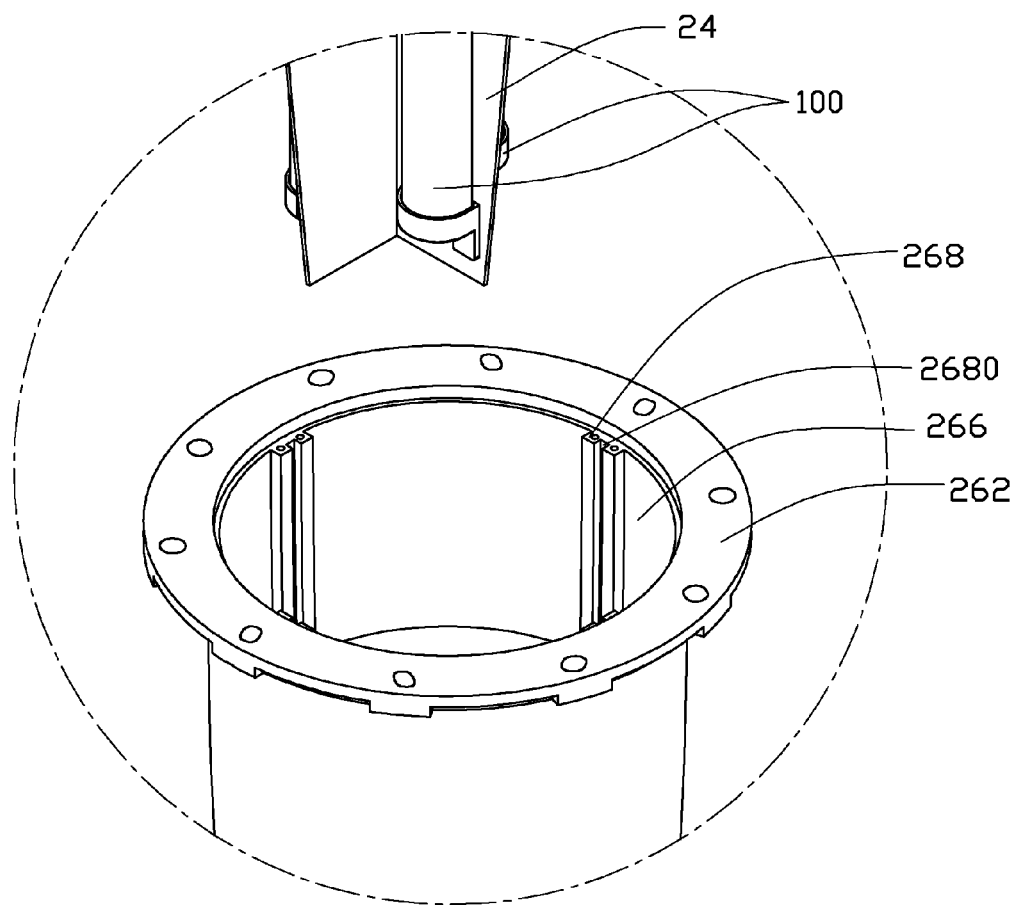
FIG. 6 is an enlarged view of a circled portion of FIG. 4.

Particular referring to FIG. 6, four protruding strips 268 are formed on an inner surface of each envelope 26, spaced from each with a constant distance and extending from the engaging flange 262 to the end plate 264. An elongated slot 2680 is defined in an inner surface of each protruding strip 268 and engagingly receives a lateral portion of the corresponding fixing plate 244 therein to secure the fixing bracket 24 in the envelope 26.

The protecting rail 29 comprises a plurality of protecting rings 290 spaced from each other and a plurality of retaining poles 292 connecting the rings 290 together. The retaining poles 292 are perpendicular to the connecting base 22 and the connecting member 28, have upper ends abutting against a lower surface of the connecting member 28 and lower ends rested on an upper surface of the connecting base 22, whereby the protecting rail 29 is securely held between the connecting base 22 and the connecting member 28 and around the lower envelope 26. The protecting rings 290 are fixed on outer sides of the retaining poles 292 and also mounted around the connecting base 22 and the connecting member 28.

In assembly of the major lamp 20, the two base plates 242 of the two fixing brackets 24 are stacked together and the fixing plates 244 of the two fixing brackets 24 respectively extending away from the coupled base plates 242 along upward and downward directions. The two engaging flanges 262 of the envelopes 26 are secured by screws to two opposite sides of the connecting member 28 which is located around the two coupled base plates 242. The two envelopes 26 enclose the fixing brackets 24, respectively. The protecting rail 29 is mounted around the lower one of the envelopes 26. The end plate 264 of the lower one of the envelopes 26 are fixed to the supporting part 220 of the connecting base 22. The inserting part 222 of the connecting base 22 is securely received in the upper opening of the cylinder 12 of the lamp post 10 to hold the major lamp 20 vertically standing on the lamp post 10.

Figure 7:
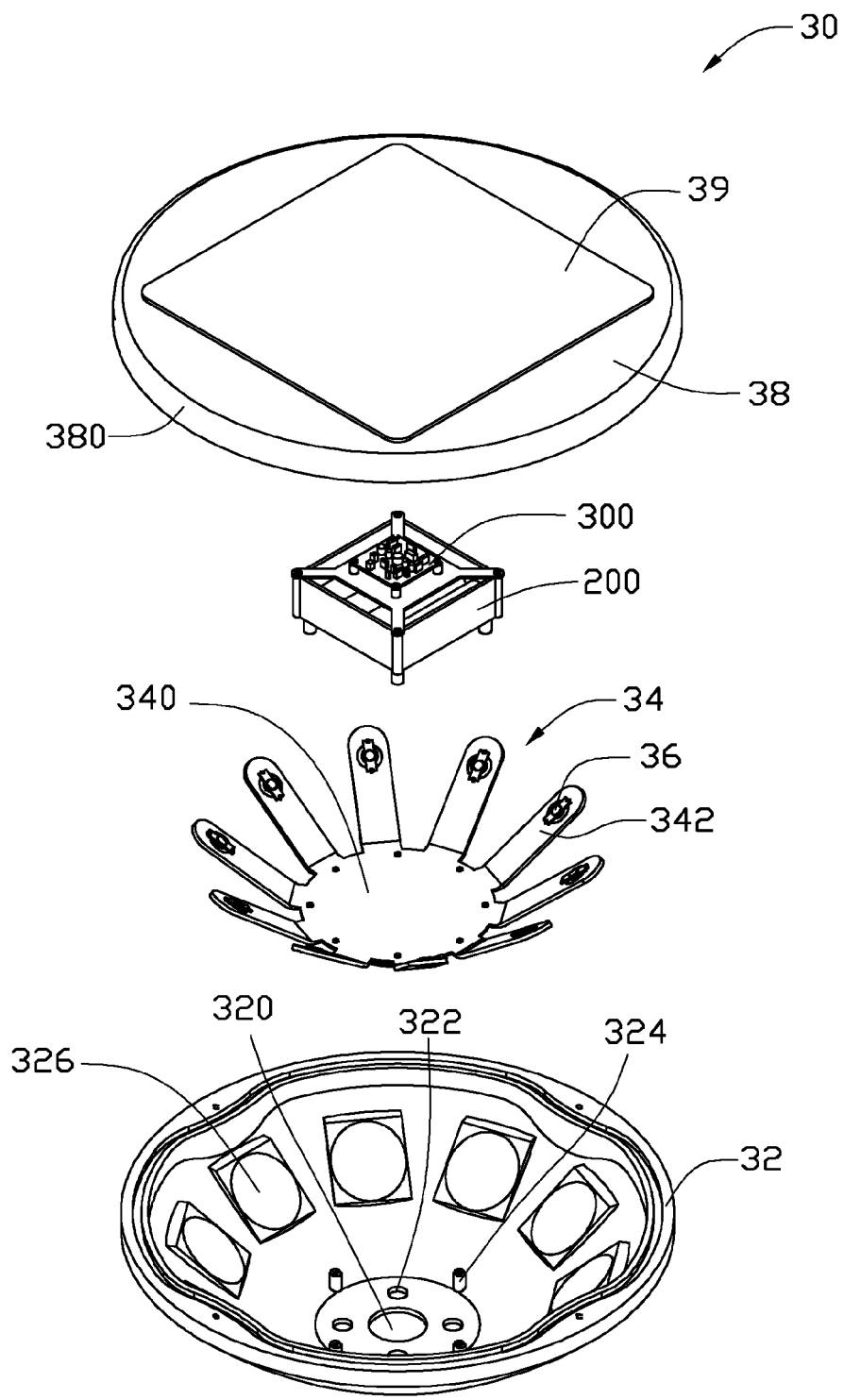
FIG. 7 is an exploded view of an auxiliary lamp of the LED lamp assembly of FIG. 1.
Figure 8:
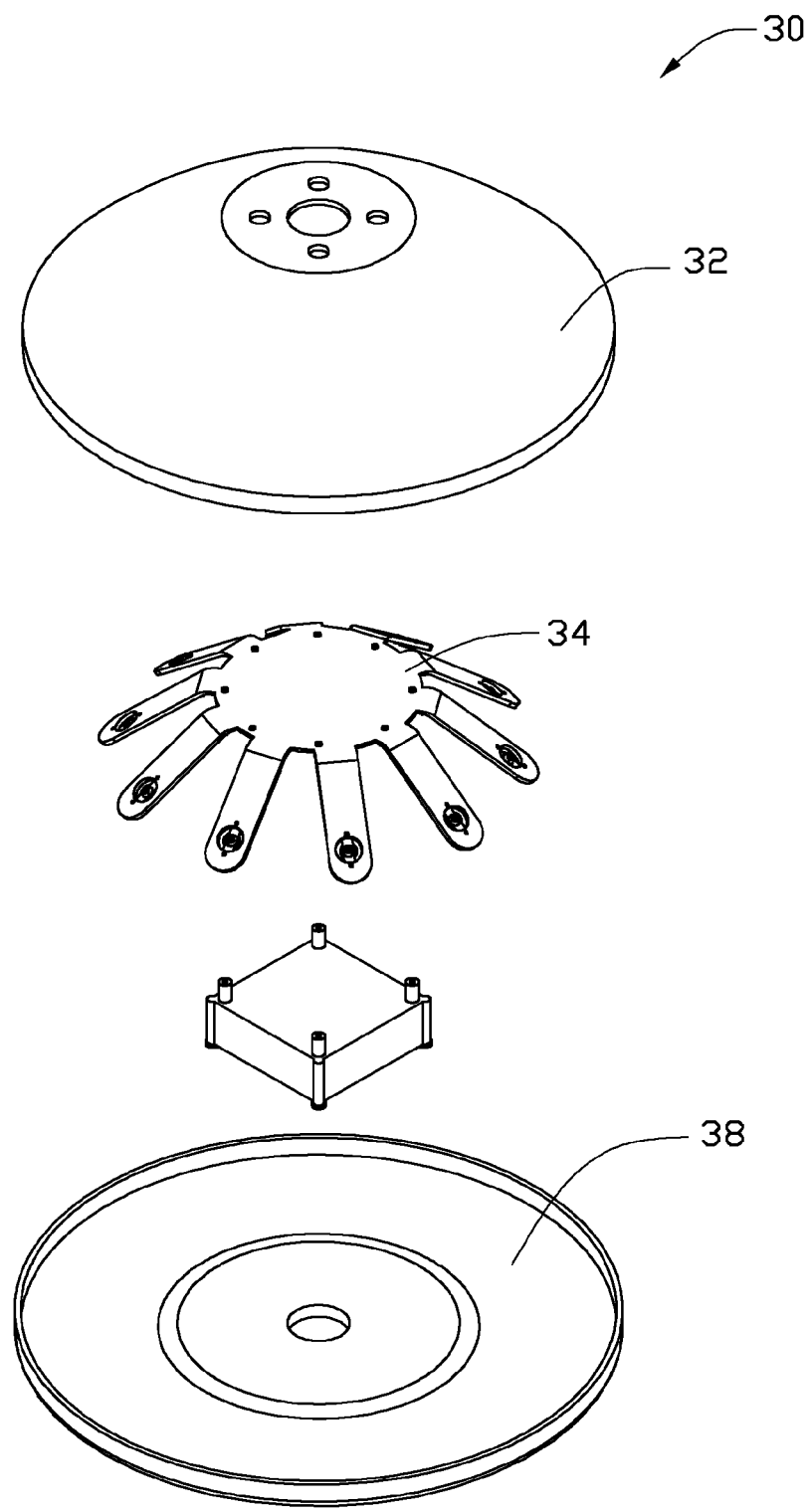
FIG. 8 is an inverted exploded view of the auxiliary lamp of the LED lamp assembly of FIG. 1.

Also referring to FIGS. 7 and 8, the auxiliary lamp 30 is secured on the end plate 264 of the upper one of the envelopes 26 and comprises a lamp shell, a support 34 accommodated in the lamp shell, a plurality of LED components 36 mounted a circumferential edge of the support 34 and a solar panel 39 laid over a top of the lamp shell.

The lamp shell includes a bowl-shaped housing 32 opening upwardly and a cover 38 covering an open of the housing 32 to enclose the support 34 and LED components 36 therein. A through hole 320 is defined in a center of a bottom of the housing 32 for lead wires and airflow extending therethrough. A plurality of fixing holes 322 are defined in the bottom of the housing 32 and surround the through hole 320 for screws extending downwardly therethrough to engage into the end plate 264 of the upper one of the envelopes 26. A plurality of fixing posts 324 extend upwardly from the bottom of the housing 32 and are located around the fixing holes 322 for positioning the support 34. A plurality of light-outputting windows 326 spaced from each other with a constant distance are defined in a sidewall of housing 32 and respectively corresponding to the LED components 36 for light generated by the LED components 36 being evenly distributed outside of the auxiliary lamp 30. The housing 32 can be integrally made of transparent material, such as glass or plastic and then coated with a black paint or film thereon, except the light-outputting windows 326.

The support 34 comprises a circular retaining plate 340 and a plurality of elongated mounting sheets 342 extending outwardly and upwardly from an edge of the retaining plate 340. The retaining plate 340 received in the housing 32 is placed on the fixing posts 324 and secured by screws (not shown) extending therethrough to be engagingly received in the fixing posts 324. The mounting sheets 342 extending radially and obliquely from the edge of the retaining plate 340 are symmetrically arranged around the retaining plate 340 and respectively face the light-outputting windows 326 of the housing 32. Each LED component 36 is mounted on an outer side of one of the mounting sheets 342 and located adjacent and directed to one of the light-outputting windows 326.

The cover 38 is circular has a diameter slightly larger than that of the top of the housing 32. The cover 38 has an annular flange 380 extending downwardly and perpendicularly from an edge thereof. The cover 38 is laid over the top of the housing 32 with the annular flange 380 located snugly around the top of the housing 32. A rechargeable battery 200 and a controlling and driving circuit board 300 are placed on the retaining plate 340 of the support 34 in the housing 32.

The solar panel 39 is arranged on a top surface of the cover 38 and thus is directly exposed to sunshine. The solar panel 39 is used for converting solar energy into electrical energy. The solar panel 39 is electrically connected to an input end of the rechargeable battery 200 and thus the electrical energy converted thereby can be stored in the rechargeable battery 200, which enables the rechargeable battery 200 to provide electric current to LED components 36 of the auxiliary lamp 30 which are electrically connected to an output end of the battery 200 via the driving and controlling circuit board 300.

During operation of the present LED lamp assembly, not only the major light 20 and the lamp post 10 are powered by electrical power from a power plant to generate light, but also the auxiliary lamp 30 is powered to generate light by the rechargeable battery 200 which stores electrical energy converted from solar energy therein. Furthermore, when there is no goer or visitor close to the LED lamp assembly, the major lamp 30 is automatically turned off by the driving and controlling circuit board 300 and only the auxiliary lamp 30 which is powered by solar energy is turned on, thereby being energy-saving and environment-friendly.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:
1. An LED lamp assembly comprising:
a pole-shaped major lamp for being powered by electrical power from a power plant; and
an auxiliary lamp fixed on a top of the major lamp and comprising a lamp shell, a plurality of LED components accommodated in the lamp shell and a solar panel mounted thereon, a plurality of light-outputting windows being defined in a sidewall of the lamp shell; and a rechargeable battery having an input end electrically connected to the solar panel and an output end electrically connected to the LED components;

wherein the LED components of the auxiliary lamp are powered by the rechargeable battery to generate light radiating outside of the lamp shell through the light-outputting windows, the rechargeable battery being charged by the solar panel;

wherein the LED components are located adjacent and directed to the light-outputting windows, respectively;

wherein the auxiliary lamp further comprises a support received in the lamp shell, the support having a retaining plate fixed on a bottom of the lamp shell and a plurality of mounting sheets extending radially and obliquely from the edge of the retaining plate, each LED component being mounted on an out side of one of the mounting sheets and facing one of the light-outputting windows; and wherein the lamp shell comprises a bowl-shaped housing opening upwardly and a cover covering an open of the housing to enclose the support and LED components in the lamp shell, the solar panel being laid over a top of the cover.

2. The LED lamp assembly of claim 1, wherein the housing is integrally made of transparent material and coated with one of a black film and a black paint, except the light-outputting windows.

3. The LED lamp assembly of claim 1, wherein the major lamp comprises two fixing brackets in a butt joint with each other and a plurality of light emitting members mounted in the fixing brackets, each fixing bracket having a base plate overlapping the base plate of another fixing bracket and two fixing plates extending away from the coupled base plates.

4. The LED lamp assembly of claim 3, wherein the two fixing plates perpendicularly intersect each other, and wherein a point of the intersection is in a vertical alignment with a center of the base plate, two of the light emitting members being attached to opposite sides of one of the fixing plates, the light emitting members being separated from each other by the fixing plates.

5. The LED lamp assembly of claim 4, wherein a width of the each fixing bracket is decreased gradually from the base plate to an end remote from the base plate.

6. The LED lamp assembly of claim 3, wherein the major lamp further comprises a connecting base at a bottom thereof, two envelopes respectively accommodating the two fixing brackets and a connecting member coupling the two envelopes together.

7. The LED lamp assembly of claim 6, wherein each envelope has an annular engaging flange, an end plate and a covering body extending from an inner edge of the engaging flange to an outer circumference of the end plate, the two engaging flanges of the envelopes are attached to two opposite sides of the connecting member which is located around the two coupled end plates of the fixing brackets.

8. The LED lamp assembly of claim 7, wherein four protruding strips are formed on an inner surface of each envelope, extend from the engaging flange to the end plate and each define an elongated slot in an inner surface thereof, the each slot engagingly receiving a lateral portion of a corresponding fixing plate therein.

9. The LED lamp assembly of claim 8, wherein the end plate has a diameter smaller than an inner diameter of the engaging flange, the envelope tapering from the engaging flange to the end plate, the end plate of a lower one of the envelopes being fixed to a top of the connecting base to make the major lamp vertically stand on the connecting base, the auxiliary lamp being placed on the end plate of an upper one of the envelopes.

10. The LED lamp assembly of claim 1, further comprising a lamp post supporting the major lamp thereon, the lamp post comprising a cylinder defining a plurality of openings in a sidewall thereof, a plurality of light emitting members received therein to generate light radiating through the openings and a plurality of light guiding plates attached an inner surface of the cylinder and surrounding the light emitting members.

11. The LED lamp assembly of claim 10, wherein the cylinder has a plurality of holding parts protruding inwardly from the inner surface thereof, the holding parts being spaced from each other with a constant distance and extending along a length of the cylinder, each of the holding parts including two ribs extending curvedly and toward each other from the inner wall of the cylinder, the two ribs of each holding part being slantwise and at an acute angle to the inner wall of the cylinder, each light-guiding plate being clipped between two neighboring holding parts in the cylinder.

12. An LED lamp assembly comprising:

a lamp post comprising a cylinder defining a plurality of openings in a sidewall thereof and a light emitting member received in the cylinder to generate light radiating outside through the openings;

a pole-shaped major lamp supported on a top of the lamp post for being powered by electrical power from a power plant; and an auxiliary lamp fixed on a top of the major lamp and comprising a lamp shell, a plurality of LED components accommodated in the lamp shell and a solar panel mounted thereon, a plurality of light-outputting windows being defined in a sidewall of the lamp shell; and a rechargeable battery having an input end electrically connected to the solar panel and an output end electrically connected to the LED components;

wherein the LED components of the auxiliary lamp are powered by the rechargeable battery to generate light radiating outside of the lamp shell through the light-outputting windows, the rechargeable battery being charged by the solar panel.

13. The LED lamp assembly of claim 12, wherein the LED components are located adjacent and directed to the light-outputting windows, respectively.

14. The LED lamp assembly of claim 13, wherein the auxiliary lamp further comprises a support received in the lamp shell, the support having a retaining plate fixed on a bottom of the lamp shell and a plurality of mounting sheets extending radially and obliquely from the edge of the retaining plate, each LED component being mounted on an out side of one of the mounting sheets and facing one of the light-outputting windows.

15. The LED lamp assembly of claim 14, wherein the lamp shell comprises a bowl-shaped housing opening upwardly and a cover covering an open of the housing to enclose the support and the LED components in the lamp shell, the solar panel being laid over a top of the cover.

16. The LED lamp assembly of claim 15, wherein the housing is integrally made of transparent material and coated with one of a black film and a black paint everywhere, except the light-outputting windows.

17. An LED lamp assembly comprising:

a pole-shaped major lamp for being powered by electrical power from a power plant; and an auxiliary lamp fixed on a top of the major lamp and comprising a lamp shell, a plurality of LED components accommodated in the lamp shell and a solar panel mounted thereon, a plurality of light-outputting windows being defined in a sidewall of the lamp shell; and a rechargeable battery having an input end electrically connected to the solar panel and an output end electrically connected to the LED components;

wherein the LED components of the auxiliary lamp are powered by the rechargeable battery to generate light radiating outside of the lamp shell through the light-outputting windows, the rechargeable battery being charged by the solar panel; and wherein the major lamp comprises two fixing brackets in a butt joint with each other and a plurality of light emitting members mounted in the fixing brackets, each fixing bracket having a base plate overlapping the base plate of another fixing bracket and two fixing plates extending away from the coupled base plates.

18. The LED lamp assembly of claim 17, wherein the two fixing plates perpendicularly intersect each other, and wherein a point of the intersection is in a vertical alignment with a center of the base plate, two of the light emitting members being attached to opposite sides of one of the fixing plates, the light emitting members being separated from each other by the fixing plates.

* * * * *